United States Patent
Higgins

(10) Patent No.: US 8,394,445 B2
(45) Date of Patent: Mar. 12, 2013

(54) SHORTENING COMPOSITIONS AND METHODS OF MAKING AND USING THE SAME

(75) Inventor: Neil Wallace Higgins, Bourbonnais, IL (US)

(73) Assignee: Bunge Oils, Inc., St. Louis, MO (US)

( * ) Notice: Subject to any disclaimer, the term of this patent is extended or adjusted under 35 U.S.C. 154(b) by 368 days.

(21) Appl. No.: 12/780,769

(22) Filed: May 14, 2010

(65) Prior Publication Data

US 2011/0281014 A1 Nov. 17, 2011

(51) Int. Cl.
 *A23D 9/00* (2006.01)
(52) U.S. Cl. ........................................ 426/606; 426/607
(58) Field of Classification Search .................. 426/606, 426/607
See application file for complete search history.

(56) References Cited

U.S. PATENT DOCUMENTS

| | | | |
|---|---|---|---|
| 3,751,265 A * | 8/1973 | Seiden .......................... | 426/611 |
| 4,156,021 A | 5/1979 | Richardson | |
| 4,456,626 A * | 6/1984 | Nelson et al. ................. | 426/553 |
| 5,106,644 A | 4/1992 | El-Nokaly | |
| 5,470,598 A | 11/1995 | Scavone | |
| 5,525,368 A * | 6/1996 | Rha et al. ....................... | 426/658 |
| 5,736,177 A | 4/1998 | McGinley et al. | |
| 5,766,662 A | 6/1998 | Inglett | |
| 6,033,703 A | 3/2000 | Roberts et al. | |
| 6,312,751 B1 * | 11/2001 | Cain et al. ..................... | 426/607 |
| 6,312,752 B1 * | 11/2001 | Lansbergen et al. .......... | 426/607 |
| 6,406,737 B1 * | 6/2002 | Cain et al. ..................... | 426/601 |
| 6,461,661 B1 | 10/2002 | Benesh | |
| 7,141,265 B2 * | 11/2006 | Sakuma et al. ............... | 426/601 |
| 8,192,781 B2 * | 6/2012 | Kameo et al. ................. | 426/601 |
| 2002/0142072 A1 * | 10/2002 | Huxel ............................ | 426/98 |
| 2003/0099747 A1 | 5/2003 | Eini et al. | |
| 2005/0064068 A1 | 3/2005 | Shukla et al. | |
| 2005/0271790 A1 | 12/2005 | Aronson et al. | |
| 2010/0112122 A1 * | 5/2010 | Hong et al. ........................ | 426/2 |
| 2011/0059221 A1 * | 3/2011 | Andou et al. ................. | 426/606 |
| 2011/0097471 A1 * | 4/2011 | Arlinghaus ................... | 426/549 |
| 2011/0281015 A1 | 11/2011 | Higgins | |

* cited by examiner

*Primary Examiner* — Carolyn Paden
(74) *Attorney, Agent, or Firm* — Jones Day

(57) ABSTRACT

Described herein are shortening compositions having reduced levels of saturated and trans fats. The compositions comprise cellulose fibers, a hard fat and a liquid oil. Also provided are methods of preparing such compositions and use thereof.

25 Claims, No Drawings

SHORTENING COMPOSITIONS AND METHODS OF MAKING AND USING THE SAME

FIELD

Provided herein are shortening compositions having reduced levels of saturated and trans fats. The compositions comprise cellulose fibers, a hard fat and a liquid oil. Also provided are methods of preparing such compositions and use thereof.

BACKGROUND

Shortenings are generally produced by appropriate thermal and mechanical treatment of a mixture of several components. In the production of a conventional plastic shortening, lightly hydrogenated vegetable oils and intermediate hardened oils are blended with fully hydrogenated hardstock in varying proportions to produce a product which is approximately 85% oil and 15% solid at room temperature. The quality and texture of shortenings depend on incorporated gas, plasticity and consistency, and solid to liquid ratio. These physical characteristics are determined by the crystal phase of the fats used and the method of preparation.

In general, the method of attaining the beta prime crystal form desired for plastic shortenings is to use a suitable beta prime tending highly hydrogenated or saturated hardstock. Conventional beta prime tending hardstocks contain triglycerides that may undergo polymorphic transformations and crystal size changes on processing and storage and/or on temperature variations under stress conditions. This transformation results in a shortening which has a poor appearance, poor volume and poor performance. Further, the hydrogenation process causes transisomeric forms of the mono and polyunsaturates to form.

It has been suggested in the literature that the consumption of trans fatty acids and saturated fatty acids can increase the amount of LDL cholesterol in the body, and that consumption of trans fatty acids also can reduce HDL cholesterol levels. There have been various shortening compositions proposed in an attempt to reduce the trans fatty acids and saturated fatty acid content in shortenings. Exemplary compositions are described in US publication 2005/0271790, U.S. Pat. Nos. 5,106,644, 6,033,703, 5,470,598, 4,156,021 and 6,461,661. Among various shortening formulations available, VREAM® formulated using partially hydrogenated oil and a heavily hydrogenated oil contains the total amount of partially hydrogenated oil and a heavily hydrogenated oil is about 50%, VREAM®NH formulated without use of hydrogenation contains the total amount of trans plus saturated fatty acids is about 52%, and VREAM RighT® formed by using a hydrogenated base stock and a fully hydrogenated oil contains the total amount of trans plus saturated fatty acids is about 32%.

There is a continuing need for shortenings having reduced levels of saturated fats and trans fats, and acceptable physical properties for handling and food preparation.

SUMMARY

In certain embodiments, provided herein are shortening compositions comprising a cellulose fiber, a hard fat and a liquid oil. In certain embodiments, the use of cellulose fibers allows a plastic shortening like material to be produced with reduced levels of both trans fatty acids and saturated fatty acids compared to a shortening compositions without the fibers.

The cellulose fibers are used in the compositions without hydrating with water, or treatment with other additives such as gums or emulsifiers. In certain embodiments, a shortening composition provided herein comprises less than about 1% water by weight based on total weight of the composition. In certain embodiments, the shortening composition provided herein comprises less than about 0.1%, 0.3%, 0.5%, 0.7%, 1%, 1.5%, 2%, 2.5%, or 3% water by weight based on total weight of the composition. The cellulose fibers having a range of average lengths, processed from different source materials and of different levels of purity can be used.

In certain embodiments, the hard fat used herein comprises fully or partially hydrogenated oil(s), solid stearin fractions, partial esters such as diglycerides and monoglycerides, waxes or mixtures thereof. In certain embodiments, the liquid oil used herein comprises canola, high oleic canola, soybean, corn, sunflower, rapeseed, peanut, safflower, olive, cottonseed, or a mixture thereof.

In another embodiment, provided herein is a method for preparing the shortening compositions described herein. In certain embodiments, the method of preparation comprises the step of providing a composition comprising a cellulose fiber, a hard fat and a liquid oil, and mixing the composition to provide a shortening composition. During the mixing step, the composition is brought to a molten state such that the admixture becomes homogenized. The order of adding the ingredients and heating the ingredients can be changed as required by a particular process. The molten homogeneous composition then is cooled, in one embodiment, with agitation, to promote a crystal structure that imparts the desired physical properties to the shortening. A heat exchanger, in one embodiment, a scraped surface heat exchanger, can provide the desired cooling with agitation.

In certain embodiments, the shortenings so produced has lower levels of saturated fats and trans fats than the shortenings known in the art. In certain embodiment, the shortening compositions provided herein are used in bakery products, e.g., cookies, cakes, pie crusts, breads and other products in place of conventional partially hydrogenated shortenings.

It is to be understood that both the foregoing general description and the following detailed description are exemplary and explanatory only and are not restrictive.

DETAILED DESCRIPTION

Provided herein are shortening compositions comprising a cellulose fiber, a hard fat to provide a crystal matrix and a liquid oil. Further provided are methods of making the compositions and uses of the compositions. The methods and compositions are described in detail in the sections below.

Definitions

Unless defined otherwise, all technical and scientific terms used herein have the same meaning as is commonly understood by one of ordinary skill in the art. All patents, applications, published applications and other publications are incorporated by reference in their entirety. In the event that there are a plurality of definitions for a term herein, those in this section prevail unless stated otherwise.

The term "plastic" as used herein is utilized to designate a shortening composition which is solid at room temperature.

The term "fat" as used herein is intended to include all edible, fatty acid triglycerides regardless of origin or whether they are solid or liquid at room temperature. Thus, the term "fat" includes normally liquid and normally solid vegetable and animal fats and oils.

The term "hard fat" or "hydrogenated fat" as used herein refers to fully or partially hydrogenated oil(s), solid stearin fractions, partial esters such as diglycerides and monoglycerides, waxes or mixtures thereof.

The term "oil" as employed herein, is intended to refer to those fats which are liquid in their unmodified state. Natural and synthetic fats and oils are included in these terms.

The term "edible oil", "base oil" or "liquid oil" as used herein refers to an oil which is substantially liquid at room temperature. The base oil or liquid oil can be unhydrogenated oil or partially hydrogenated oil, modified oil or mixtures thereof.

As used herein, 'cellulose fiber" refers to a fibrous cellulose material obtained from plant sources. The fibrous nature of the material and the existence of capillaries that can take up oil is an important feature for the cellulose fiber used herein. Exemplary cellulose fibers are obtained from pea and bamboo.

It must be noted that, as used in the specification and the appended claims, the singular forms "a," "an" and "the" include plural referents unless the context clearly dictates otherwise. Thus, for example, reference to "a vegetable oil" includes mixtures of two or more such vegetable oils, and the like. In one embodiment, reference to "a vegetable oil" includes interesterified and/or genetically modified oils.

All percent values are given as weight percent unless expressly stated otherwise.

Compositions

In certain embodiments, provided herein are shortening compositions comprising a cellulose fiber, a hard fat and a liquid oil. The hard fat in the compositions provides a crystal matrix for the composition. Without being bound to any particular theory, it is believed that in certain embodiments, the cellulose fibers aid in structuring the shortening, partly at least by taking some of the oil into capillaries and tying up some oil wetting the fiber surfaces, and partly by physically acting to re-enforce the crystal structure formed by the higher melting fractions incorporated into the composition. In certain embodiments, the use of cellulose fibers allows a plastic shortening to be produced with reduced levels of both trans fatty acids and saturated fatty acids compared to a shortening formulated without the cellulose fibers. In certain embodiments, the use of cellulose fibers allows trans fatty acids plus saturated fat acids level in the shortening composition to be reduced by about 75%, 70%, 65%, 60%, 55%, 50%, 45%, 40%, 35%, 32%, 30%, 25%, 20%, 18%, 15%, 10% or 5% by weight as compared to the shortening compositions known in the art. In certain embodiments, the use of cellulose fibers allows trans fatty acids plus saturated fat acids level in the shortening composition to be reduced by about 25%, 20%, 18%, 15%, 10% or 5% by weight as compared to the shortening compositions VREAM RighT®.

The cellulose fibers are used in the compositions without hydrating with water, or treatment with other additives such as gums or emulsifiers. In certain embodiments, the shortening composition provided herein comprises less than about 0.1%, 0.3%, 0.5%, 0.7% or 1% water by weight based on total weight of the composition. The cellulose fibers having a range of average lengths, processed from different source materials and of different levels of purity can be used. In certain embodiments, the shortening composition provided herein comprises less than about 1% water by weight based on total weight of the composition.

In certain embodiments, the cellulose fibers for use herein are obtained from plant sources, including but not limited to bamboo, pea, citrus fruit and sugar beets. In certain embodiments, the cellulose fibers used herein include, UPTAKE 80, and CENTU-TEX, CeREAFill produced by Norben Company, Inc., CREAFIBE QC 150, and CREACLEAR SC 150 produced by CREAFILL Fibers Corp., and Solka Floc 900 FCC, Solka Floc 300 FCC, and Solka Floc 40 FCC produced by International Fiber Corporation. In certain embodiments, the cellulose fibers are obtained from an algal source. Any cellulose material having fibrous nature and capillaries that can take up oil can be used in the compositions provided herein. Unlike the compositions known in the literature, for example, US publication no. 2005/0271790, the compositions herein do not require a high purity cellulose fiber.

In certain embodiments, the compositions provided herein comprise the cellulose fiber in an amount from about 1 to about 15% by weight based on the total weight of the composition. In certain embodiments, the amount of the cellulose fiber in the compositions is about 1%-10%, about 1%-7%, about 1%-4%, about 2%-10%, about 2%-7%, or about 2%-5% by weight based on the total weight of the composition. In certain embodiments, the amount of the cellulose fiber in the compositions is about 1, 2, 3, 4, 5, 6, 7, 8, 9, 10, 11, 12, 13, 14 or 15% by weight based on the total weight of the composition.

The cellulose fibers are used in the compositions without hydrating with water, or treatment with other additives such as gums or emulsifiers. In certain embodiments, a shortening composition provided herein comprises less than about 1% water by weight based on total weight of the composition. In certain embodiments, the shortening composition provided herein comprises less than about 0.1%, 0.3%, 0.5%, 0.7%, 1%, 1.5%, 2%, 2.5%, or 3% water by weight based on total weight of the composition. The cellulose fibers having a range of average lengths, processed from different source materials and of different levels of purity can be used.

In certain embodiments, the hard fat used herein comprises fully or partially hydrogenated oil(s), solid stearin fractions, partial esters such as diglycerides and monoglycerides, waxes or mixtures thereof. In certain embodiments, the fully hydrogenated oil is selected from fully hardened fish oil, fully hardened animal oil, fully hardened palm oil, fully hardened high erucic rape seed oil, fully hardened soya oil, fully hardened sun flower oil, fully hardened corn oil, fully hardened peanut oil, fully hardened safflower oil, fully hardened olive oil, fully hardened palm stearin, fully hardened palm olein, derivatives and mixtures thereof. In certain embodiments, the partially hydrogenated oil is selected from partly hardened fish oil, partly hardened animal oil, partly hardened palm oil, partly hardened high erucic rape seed oil, partly hardened soya oil, partly hardened sun flower oil, partly hardened corn oil, partly hardened peanut oil, partly hardened safflower oil, partly hardened olive oil, partly hardened palm stearin, partly hardened palm olein, partly hardened cotton seed oil, derivatives and mixtures thereof. In certain embodiments, the stearin fraction or the monoglyceride and/or diglyceride can be derived from natural food grade fats, including plant fats, such as coconut oil, palm oil, palm kernel oil, and the like, or fats that have been fully hydrogenated. Thus, in certain embodiments, the stearin fraction or the monoglyceride and/or diglyceride is derived from naturally saturated fats or oils. In certain embodiments, stearin fraction or monoglyceride and/or diglyceride is derived from palm oil.

In certain embodiments, the total amount of hard fat used in the compositions provided herein is from about 5 to about 20% by weight based on the total weight of the composition.

In certain embodiments, the total amount of hard fat in the compositions is about 7%-15%, about 7%-13%, about 8%-15%, about 8%-12%, about 8%-11%, or about 9%-11% by weight based on the total weight of the composition. In certain embodiments, the total amount of hard fat in the compositions is about 5, 6, 7, 8, 9, 10, 10, 11, 12, 13, 14, 15, 16, 17, 18, 19, 20, 21, 22, 23, 24, or 25% by weight based on the total weight of the composition. In certain embodiments, the total amount of hard fat in the compositions is about 9, 9.5, 10, 10.5, 10.75, 11, 11.5, 12, 12.5, or 13% by weight based on the total weight of the composition.

In certain embodiments, the hard fat used herein is selected from palm hard fat, soybean oil hard fat, cotton hard fat, palm stearin, a blend of triglycerides, diglycerides, monoglycerides produced from soybean oil then hydrogenated to saturation, and cotton hard fat. In certain embodiments, the hard fat used herein comprises a blend of palm hard fat and soybean oil hard fat.

In certain embodiments, the amount of palm hard fat in the hard fat blend is about 60-85% by weight based on the total weight of the hard fat in the composition. In certain embodiments, the amount of palm hard fat in the hard fat blend is about 70-80%, 70-85%, 75-80%, 75-85%, or 76-79% by weight based on the total weight of the hard fat in the composition. In certain embodiments, the amount of palm hard fat in the hard fat blend is about 70, 72, 74, 75, 76, 77, 78, 79, 80, 81, 82, 83, 84, or 85% by weight based on the total weight of the hard fat in the composition. In one embodiment, the amount of palm hard fat in the hard fat blend is about 76, 76.5, 77, 77.5, 78, 78.5, 79, 79.5, 80, 80.5, 81, 81.5, 82, 82.5, 83, 83.5, 84, 84.5 or 85% by weight based on the total weight of the hard fat in the composition. In certain embodiments, the amount of soybean oil hard fat in the hard fat blend is about 60-85% by weight based on the total weight of the hard fat in the composition. In certain embodiments, the amount of soybean oil hard fat in the hard fat blend is about 15-35%, 17-32%, 20-30%, or 20-25%, by weight based on the total weight of the hard fat in the composition. In certain embodiments, the amount of soybean oil hard fat in the hard fat blend is about 15, 17, 20, 22, 24, 26, 28, 30, 32, 34, or 35% by weight based on the total weight of the hard fat in the composition. In one embodiment, the amount of soybean oil hard fat in the hard fat blend is about 20, 20.5, 21.5, 22, 22.5, 23, 23.5, 24, 24.5 or 25% by weight based on the total weight of the hard fat in the composition.

In certain embodiments, the hard fat used herein comprises cotton hard fat. In certain embodiments, the amount of cotton hard fat in the composition is about 7-20% by weight based on the total weight of the composition. In certain embodiments, the amount of cotton hard fat in the composition is about 7-20%, 7-17%, or 9-17% by weight based on the total weight of the composition. In certain embodiments, the amount of cotton hard fat in the composition is about 7, 9, 11, 13, 15, 17, 19 or 20% by weight based on the total weight of the composition.

In certain embodiments, the hard fat used herein comprises soybean oil hard fat. In certain embodiments, the amount of soybean oil hard fat in the composition is about 5-20% by weight based on the total weight of the composition. In certain embodiments, the amount of soybean oil hard fat in the composition is about 7-20%, 7-17%, 9-17%, or 10-15% by weight based on the total weight of the composition. In certain embodiments, the amount of soybean oil hard fat in the composition is about 8, 10, 12, 14, 16, 18 or 20% by weight based on the total weight of the composition.

In certain embodiments, the hard fat used herein comprises palm hard fat. In certain embodiments, the amount of palm hard fat in the composition is about 5-20% by weight based on the total weight of the composition. In certain embodiments, the amount of palm hard fat in the composition is about 7-20%, 7-17%, 9-17%, or 10-15% by weight based on the total weight of the composition. In certain embodiments, the amount of palm hard fat in the composition is about 8, 10, 12, 14, 16, 18 or 20% by weight based on the total weight of the composition.

In certain embodiments, the hard fat used herein comprises palm stearin. In certain embodiments, the amount of palm stearin in the composition is about 15-30% by weight based on the total weight of the composition. In certain embodiments, the amount of palm stearin in the composition is about 15-25%, 17-25%, 20-25%, or 20-30% by weight based on the total weight of the composition. In certain embodiments, the amount of palm stearin in the composition is about 15, 17, 20, 21, 22, 23, 24, 25, 26, 28, or 30% by weight based on the total weight of the composition.

In certain embodiments, the hard fat used herein comprises a blend of triglycerides, diglycerides, and monoglycerides produced from soybean oil then hydrogenated to saturation. In certain embodiments, the amount of the blend from soybean oil in the composition provided herein is about 5-20% by weight based on the total weight of the composition. In certain embodiments, the amount of the blend from soybean oil in the composition is about 7-20%, 7-17%, 9-17%, or 10-15% by weight based on the total weight of the composition. In certain embodiments, the amount of the blend from soybean oil in the composition is about 8, 10, 12, 14, 16, 18 or 20% by weight based on the total weight of the composition.

In certain embodiments, the liquid oil used herein comprises canola, high oleic canola, soybean, corn, sunflower, rapeseed, peanut, safflower, olive, cottonseed, or a mixture thereof. In certain embodiments, the amount of liquid oil in the composition is about 70-90% by weight based on the total weight of the composition. In certain embodiments, the amount of palm stearin in the composition is about 75-90%, 80-90%, 75-85%, or 82-88% by weight based on the total weight of the composition. In certain embodiments, the amount of liquid oil in the composition is about 75, 77, 79, 80, 82, 83, 84, 85, 86, 87, 88, 89, or 90% by weight based on the total weight of the composition. In certain embodiments, the amount of liquid oil in the composition is about 83, 83.5, 84, 84.5, 85, 85.25, 85.5, 86, 86.5, 87, 87.5, 88, 88.5, 89, or 90% by weight based on the total weight of the composition.

In certain embodiments, the compositions provided herein further comprise one or more additives. Common additives that can be added to the shortening compositions provided herein include, but are not limited to stabilizers, flavoring agents, emulsifiers, anti-spattering agents, colorants, or antioxidants. Exemplary additives are described, for example, in Campbell et al., *Food Fats and Oils*, 8th Ed., Institute of Shortening and Edible Oils, Washington, D.C.

In certain embodiments, the shortening formulations further comprise an antioxidant. A wide variety of antioxidants are suitable for use, including but not limited to butylated hydroxytoluene (BHT), butylated hydroxyanisole (BHA), tertiary butylhydroquinone (TBHQ), ethylenediaminetetracetic acid (EDTA), gallate esters (i.e. propyl gallate, butyl gallate, octyl gallate, dodecyl gallate, etc.), tocopherols, citric acid, citric acid esters (i.e. isopropyl citrate, etc.), gum guaiac, nordihydroguaiaretic acid (NDGA), thiodipropionic acid, ascorbic acid, ascorbic acid esters (i.e. ascorbyl palmitate, ascorbyl oleate, ascorbyl stearate, etc.) tartaric acid, lecithin, methyl silicone, polymeric antioxidant (Anoxomer) plant (or spice and herb) extracts (i.e. rosemary, sage, oregano, thyme, marjoram, etc.) and mixtures thereof.

In certain embodiments, the shortening formulations further comprise an emulsifier. A wide variety of emulsifiers are suitable for use, including but not limited to mono- and diglycerides, distilled monoglycerides, polyglycerol esters of $C_{12}$ to $C_{22}$ fatty acids, propylene glycol mono and diesters of $C_{12}$ to $C_{22}$ fatty acids, sucrose mono- and diesters of $C_{14}$ to $C_{22}$ fatty acids.

In certain embodiments, the shortening formulations further comprise additional ingredients, such as butter flavors, meat or tallow flavors, olive oil flavors and other natural or synthetic flavors. In certain embodiments, vitamins can be included in the compositions provided herein. In certain embodiments, various other additives can be used in the shortenings provided that they are edible and aesthetically desirable.

Methods of Preparation

In certain embodiments, the methods of preparation comprise the steps of providing a composition comprising a cellulose fiber, a hard fat and a liquid oil, and mixing the composition to provide a shortening composition. During mixing step, the composition is brought to a molten state such that admixture becomes homogenized. The order of adding the ingredients and heating the ingredients can be changed as required by a particular process. The ingredients can be added at ambient temperature, or at a higher temperature, depending on the particular system used, and it is intended that the claims appended hereto shall not be limited by the order of the heating and mixing steps. The molten homogeneous composition is cooled, in one embodiment, with agitation, to promote a crystal structure that imparts the desired physical properties to the shortening. A heat exchanger, in one embodiment, a scraped surface heat exchanger, can provide the desired cooling with agitation.

In one embodiment, provided herein is a method for preparing the shortening compositions, wherein the method comprises a) blending together the liquid oil and cellulose fiber to obtain a blend of cellulose fiber and oil, and b) mixing a hard fat in the blend. In certain embodiments, steps a) and b) are carried out at a temperature of about 40-95° C., 50-75° C., 60-75° C. or 60-70° C. In certain embodiments, the mixing step b) is followed by cooling, optionally with agitation, to obtain a solidified shortening. In certain embodiments, no external water is added during preparation of the compositions.

In certain embodiments, a mechanical agitator is used to agitate the blends in steps a) and b). In one embodiment, to step a), the agitation is carried out till the cellulose fiber disperses into the oil. In certain embodiments, step a) is started at room temperature and the oil is heated up to a temperature of about 45, 50, 53, 55, 57, 59, 61, 63, 65, 67, 70, 73 or 75° C. while mixing. In certain embodiments, the hard fat is added to the blend of liquid oil and cellulose fiber at about 50, 53, 55, 57, 59, 61, 63, 65, 67, 70, 73 or 75° C. The complete blend is mixed for an additional time of about 3-15 minutes, or 3-10 minutes and then cooled, optionally with agitation, to solidify.

In another embodiment, the method comprises a) blending together the liquid oil and hard fat, and b) mixing cellulose fiber. In certain embodiments, steps a) and b) are carried out at a temperature of about 40-95° C., 50-75° C., 50-70° C., 60-75° C. or 60-70° C. In certain embodiments, the mixing step b) is followed by cooling, optionally with agitation, to obtain a solidified shortening. In certain embodiments, no external water is added during preparation of the compositions.

The admixing of the cellulose fiber, hard fat and liquid oil can be accomplished using techniques known in the art. In certain embodiments, the admixture can be then subjected to agitation by means of a scraped-surface heat exchanger known in the art of shortening manufacture. In certain embodiments, processing conditions within the scraped-surface heat exchanger can be adjusted to further promote the desired shortening properties. The scraper blades prevent any build-up on the cylinder of crystals and other large particulates that can reduce thermal exchange and increase run time. A number of different operating parameters in the scraped-surface heat exchanger can be modified in order to optimize the one or more properties of the shortening (e.g., hardness, melting). For example, the speed of the scraping blades, the pumping speed through the scraped surface heat exchanger, and the exit temperature from the heat exchanger can be modified to optimize the hardness of the shortening, which is shown in the working examples below.

The shortenings produced herein can be used to produce a variety of foods including, but not limited to, baked goods, an icing, biscuits, bread, a pie crust, a danish, a croissant, or a pastry puff. With the reduction in total saturated and trans fat content, food products produced with the shortenings described herein can provide health benefits.

The following examples present certain exemplary embodiments and are intended by way of illustration and not by way of limitation. In each of the examples herein, percentages indicate weight percent of the total mixture, unless otherwise indicated.

EXAMPLES

The following examples are put forth so as to provide those of ordinary skill in the art with a complete disclosure and description of how the compounds, compositions, and methods described and claimed herein are made and evaluated, and are intended to be purely exemplary and are not intended to limit the scope of the claimed subject matter. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

Examples 1-2

|  | Palm Hard Fat (PHF) (g) | Soyabean Hard Fat (SHF) (g) | High Oleic Canola Oil (HOC) (g) | Cellulose fiber (FCC 900) (g) |
|---|---|---|---|---|
| Ex. 1 | 38.7 | 25.8 | 511.5 | 24.0 (4%) |
| Ex. 2 | 36.7 | 24.4 | 507.4 | 31.5 (5.25%) |

In Examples 1 and 2, HOC and cellulose fiber were blended together at room temperature using a mechanical agitator at about 500 RPM. The mixing was started at room temperature and the oil was heated while the mixing continued. After 30 minutes, at about 93° C., the hard fat blend (PHF+SFH) was added as flakes of each component. The temperature of the mixture fell to about 81° C. Heating was continued, and after about 9 minutes, temperature was back to about 93° C. The heat was turned down about 30 minutes after adding hard fat. When temperature fell to 85° C., heat was turned off. When temperature fell to 63° C., the mixture was poured into a Cuisinart Frozen Yogurt-ICE cream & Sorbet Maker (model ICE-20) and crystallized. When it appeared grainy like apple sauce and had a consistency similar to soft mash potatoes it was poured and scraped into a 32 oz glass jar and stored.

Example 3

| | Palm Hard Fat (PHF) (g) | Soyabean Hard Fat (SHF) (g) | High Oleic Canola Oil (HOC) (g) | Cellulose fiber (FCC 900) (g) |
|---|---|---|---|---|
| Ex. 3 | 80.6 | 22.5 | 782 | 32 (3.6%) |

The high oleic canola oil and cellulose fiber were blended together in a 2500 ml beaker on a hot plate using a mechanical agitator. The agitation was enough to disperse the cellulose fiber into the oil. The mixing was started at room temperature and the oil was heated while the mixing continued up to a temperature of about 63° C., then the melted hard fat blend was added. After the hard fat addition, the temperature was about 64° C. The complete blend was mixed for an additional 5 minutes then poured into a Cuisinart Frozen Yogurt-ICE cream & Sorbet Maker (model ICE-20) and crystallized. When it appeared grainy like apple sauce and had a consistency similar to soft mash potatoes it was poured and scraped into a 32 oz glass jar and stored in a room held at 70° F.

Example 4

| | Palm Hard Fat (PHF) (g) | Soyabean Hard Fat (SHF) (g) | High Oleic Canola Oil (HOC) (g) | Cellulose Fiber (FCC 900) (g) |
|---|---|---|---|---|
| Ex. 4 | 61.5 | 22.5 | 514.5 | 24 |

The high oleic canola oil and cellulose fiber were blended together in beaker at room temperature and agitation was continued on a hot plate using a mechanical agitator. The agitation was continued for one hour. The melted hard fat blend was added at about 147° F. The complete blend was mixed for an additional 5 minutes then poured into a Cuisinart Frozen Yogurt-ICE cream & Sorbet Maker (model ICE-20) and crystallized. When it appeared grainy like apple sauce and had a consistency similar to soft mash potatoes it was poured and scraped into a 32 oz glass jar and stored in a room held at 70° F.

Examples 5-33

Examples 5-33 were prepared by the following method: The desired quantity of liquid oil was added in a 2500 mL beaker. The beaker was placed on a hotplate and an agitator was positioned. The agitator was turned on and speed was set at 300 RPM. The hot plate was turned to 200° C. The desired quantity of cellulose was added while mixing for about 20 minutes. When the oil temperature reached 70° C., the desired quantity of hard fat was addded and stirring continued. The mixing was continued for about 5 minutes. The heat and agitation were turned off after 5 minutes. The compositions were cooled as described in Examples 1-4.

| | Hard Fat Blend (PHF 77.5% + SHF 22.5%) (g) | Liquid Oil (g) | | | | Cellulose Fiber (g) | | | | | |
|---|---|---|---|---|---|---|---|---|---|---|---|
| Ex. | | HOC | Canola | Corn | Sunflower | FCC 900 | FCC 40 | FCC 300 | Centu-Tex Pea Fiber | Uptake 80 Pea Fiber | Cera Fibe QC 150 |
| 5 | 107.5 | 852.5 | | | | 40 | | | | | |
| 6 | 107.5 | 852.5 | | | | | 40 | | | | |
| 7 | 107.5 | 842.5 | | | | | | 50 | | | |
| 8 | 107.5 | | 852.5 | | | 40 | | | | | |
| 9 | 107.5 | | | 852.5 | | 40 | | | | | |
| 10 | 107.5 | | | | 852.4 | 40 | | | | | |
| 11 | 105.5 | 882.44 | | | | 10 | | | | | |
| 12 | 107.5 | 872.55 | | | | 20 | | | | | |
| 13 | 107.5 | 812.52 | | | | 80.01 | | | | | |
| 14 | 107.5 | 792.51 | | | | 100.04 | | | | | |
| 15 | 107.5 | 742.5 | | | | 150 (15%) | | | | | |
| 16 | 107.5 | 892.57 | | | | 0 | | | | | |
| 17 | 107.51 | 887.54 | | | | 5 (0.5%) | | | | | |
| 18 | 107.5 | 852.5 | | | | 40 (5%) | | | | | |
| 19 | 50.05 | 910.02 | | | | 40 (5%) | | | | | |
| 20 | 90.01 | 870.02 | | | | 40 (5%) | | | | | |
| 21 | 130 | 830 | | | | 40.01 (5%) | | | | | |
| 22 | 170 | 790 | | | | 40.4 | | | | | |
| 23 | 210 | 750 | | | | 40 | | | | | |
| 24 | 250 | 710 | | | | 40 | | | | | |
| 25 | 90.01 | 870.02 | | | | 40.15 | | | | | |
| 26 | 107.5 | 807.5 | | | | 85.6 | | | | | |
| 27 | 112.58 | 812.52 | | | | 75.4 | | | | | |
| 28 | 107.5 | 852.53 | | | | | | | 40.1 | | |
| 29 | 107.5 | 852.6 | | | | | | | | 40.15 | |
| 30 | 107.5 | 852.49 | | | | | | | | | 40.08 |
| 31 | 107.5 | 852.5 | | | | | | | | | 40.03 |
| 32* | 107.5 | 852.51 | | | | 40.01 | | | | | |
| 33 | 107.58 | 852.5 | | | | 40.16 | | | | | |

*Example 32 was prepared formulating hard fat and liquid oil before adding cellulose fiber.

Examples 34-35

In Examples 34-35, cotton hard fat was used and the compositions were prepared by method described in Examples 5-33.

| Ex. | Cotton Hard Fat (g) | Canola Oil (g) | Cellulose Fiber (FCC 900) (g) |
|---|---|---|---|
| Ex. 34 | 90 | 870.1 | 40.1 |
| Ex. 35 | 170.1 | 790 | 40.1 |

Examples 36-38

In Examples 36-38, the hard fat and liquid oil were formulated before addition of cellulose fiber as follows. In a 2500 mL beaker, the desired quantity of liquid oil was weighed. The beaker was placed on a hotplate and an agitator was positioned. The agitator was turned on and speed was set at 300 RPM. The hot plate was turned to 200° C. The desired quantity of hard fat was addded and stirring continued till temperature reached 70° C. The desired quantity of cellulose was added while mixing. The mixing was continued for about 5 minutes. The agitator speed was 300 RPM. The heat and agitation were turned off after 5 minutes. The compositions were cooled as described in Examples 1-4.

The mixture was cooled to 70° C. and then crystallized in an ice cream maker.

| | Hard Fat | | | | |
|---|---|---|---|---|---|
| Ex. | Hard Fat Blend (PHF 77.5% + SHF 22.5%) (g) | Soya hard fat (g) | Palm hard fat (g) | Canola oil (g) | Cellulose Fiber 900 FCC (g) |
| 36 | 107.5 | | | 852.5 | 40 |
| 37 | | 120 | | 840 | 40 |
| 38 | | | 120 | 840 | 40 |

Examples 39-40

In Examples 39-40, palm stearin was used as the hard fat and higher loading of cellulose fiber was used. The formulations were stirred in small amounts in the ice cream maker inside a walk-in freezer at −20° C.

| Ex. | Palm stearin (g) | Canola oil (g) | Cellulose Fiber (900 FCC) (g) |
|---|---|---|---|
| 39 | 230 | 690 | 80 |
| 40 | 210 | 710 | 80 |

Example 41

In Example 41, a structuring blend of triglycerides, diglycerides, monoglycerides produced from soybean oil then hydrogenated to saturation was used as the structuring fat.

| Ex. | Structuring blend (g) | Canola oil (g) | Cellulose Fiber (900 FCC) (g) |
|---|---|---|---|
| 41 | 120 | 840 | 40 |

This example demonstrates that components other than saturated triglycerides could be used to structure along with the cellulose fibers.

Examples 42-45

In Examples 42-45, various cellulose fibers were used to study their effect on the formulation.

| | Hard fat | | Cellulose Fiber (g) | | |
|---|---|---|---|---|---|
| Ex. | blend (g) | Canola oil (g) | 900 FCC | 40 FCC | 150 QC |
| 42 | 107.5 | 853.5 | 20 | 20 | |
| 43 | 107.5 | 852.50 | | | 40 |
| 44 | 107.5 | 852.5 | 20 | | 20 |
| 45 | 107.5 | 852.5 | | 20 | 20 |

Example 46

In Example 46, small amount of water was added to see if it helped in structuring the formulation.

| Ex. | Hard fat blend (g) | Canola oil (g) | Cellulose Fiber (900 FCC) (g) | Water (g) |
|---|---|---|---|---|
| 46 | 107.5 | 851.5 | 40 | 1 |

At this level of addition, the shortening was not noticably different from that made without any water.

Example 47

In Example 47, small amount of glycerine was added to see if it helped in structuring the formulation.

| Ex. | Hard fat blend (g) | Canola oil (g) | Cellulose Fiber (900 FCC) (g) | Glycerine (g) |
|---|---|---|---|---|
| 47 | 107.5 | 851.5 | 40 | 1.02 |

At this level of addition, the shortening was not noticably different from that made without any glycerine.

Example 48-50

In Examples 48-50, partially hydrogenated base oil was used in the formulations.

| Ex. | Hard fat blend (g) | Partially hydrogenated base oil (g) | Cellulose Fiber (900 FCC) (g) |
|---|---|---|---|
| 48 | 107.50 | 852.51 | 40 |
| 49 | 87.50 | 872.50 | 40 |
| 50 | 67.50 | 892.50 | 40 |

Examples 51-54

In Examples 51-54, an emulsifier was used for shortening formulation for cake and icing work.

| Ex. | Hard fat blend (g) | Canola oil (g) | Cellulose Fiber (900 FCC) (g) | Monoglyceride DIMODAN P-T-K-A Distilled Monoglyceride (DANISCO) (g) | Polyglycerol ester POLYALDO TGMSH-K (LONZA) (g) |
|---|---|---|---|---|---|
| 51 | 107.50 | 836 | 40 | 7.50 | 9 |
| 52 | 107.50 | 833.50 | 40 | 10 | 9 |
| 53 | 107.50 | 833.50 | 40 | 7.50 | 11.50 |
| 54 | 107.50 | 822.50 | 40 | 14 | 16.01 |

Example 55

In Example 55, a pilot plant run was conducted using the following ingredients:

| Ex. | Palm Hard Fat (%) | Soya Hard Fat (%) | QC 150 CreaFibe (%) | High Oleic Canola (%) |
|---|---|---|---|---|
| 55 | 8.3313 | 2.4187 | 4.5000 | 84.7500 |

A batch of 200 lbs was started. The composition was formulated by mixing HOC, hard fat blend and cellulose. The complete blend was recirculated through pump and static mixer for 30 minutes before going to the cooling units. Static mixers were added to recirculate the blend to help desperse cellulose fiber before going to cooling units.

Line Configuration: A-C-B-Fill

A and C units are cooling units, the B unit is a working unit with pins on a rotor and pins projecting from cylindar wall.

| | Condition one target | Condition one actual |
|---|---|---|
| Feed tank temp | 129 F. | 130 F. |
| Feed pump setting | 1 | 1 |
| Temp A outlet | 78 F. | 78 F. |
| Temp B outlet | 68 F. | 67 F. |
| Temp C outlet | 66 F. | 66 F. |
| varidrive setting on cooling unit shafts | | |
| A unit | 7 | 7 |
| B unit | 3 | 3 |
| C unit | 7 | 7 |

Back pressure 6 PSIG, Ammonia setting A 60, C 55 nitrogen enough to make product white.

The product was fluid going into box as a self leveling white liquid. It took 2.4 minutes to fill 10 lb.

| | Condition two target | Condition two actual |
|---|---|---|
| Feed tank temp | 130 F. | 131 F. |
| Feed pump setting | 1 | 1 |
| Temp A outlet | 77-78 F. | 78 F. |
| Temp B outlet | 68 F. | 69 F. |
| Temp C outlet | 66 F. | 66 F. |
| varidrive setting on cooling unit shafts | | |
| A unit | 7 | 7 |
| B unit | 5 | 5 |
| C unit | 7 | 7 |

Back pressure 8 PSIG Ammonia setting A 45 C 50 nitrogen enough to make product white.

The product was fluid going into the box as a self leveling white liquid. It took 2.4 minutes to fill 10-lb.

| | Condition three target | Condition three actual |
|---|---|---|
| Feed tank temp | 128 F. | 130 F. |
| Feed pump setting | 1 | 1 |
| Temp A outlet | 78 F. | 78 F. |
| Temp B outlet | 65 F. | 65 F. |
| Temp C outlet | 63 F. | 63 F. |
| varidrive setting on cooling unit shafts | | |
| A unit | 7 | 7 |
| B unit | 5 | 5 |
| C unit | 7 | 7 |

Back pressure 10 PSIG Ammonia setting A 40 C 45 nitrogen enough to make product white.

The product was fluid going into the box as a self leveling white liquid. It took 2.4 minutes to fill 10-lb.

Example 56

In Example 56, pilot plant run for cake and icing shortening was conducted using the following ingredients:

| Ex. | Palm Hard Fat (%) | Soya Hard Fat (%) | QC 150 CreaFibe (%) | High Oleic Canola (%) | Monoglyceride DIMODAN P-T-K-A Distilled Monoglyceride (DANISCO) (g) |
|---|---|---|---|---|---|
| 56 | 8.0814 | 2.3461 | 4.3650 | 82.2075 | 3.000 |

A batch of 200 lbs was started. The composition was formulated by mixing HOC, hard fat blend and cellulose. The complete blend was recirculated through pump and static mixer for 30 minutes before going to the cooling units. Static mixers were added to recirculate the blend to help desperse cellulose fiber before going to cooling units.

Line Configuration: A-C-B-Fill

|  | Condition one target | Condition one actual |
|---|---|---|
| Feed tank temp | 129 F. | 131 F. |
| Feed pump setting | 1 | 1 |
| Temp A outlet | 78 F. | 78 F. |
| Temp B outlet | 68 F. | 68-69 F. |
| Temp C outlet | 66 F. | 66 F. |
| varidrive setting on cooling unit shafts | | |
| A unit | 7 | 7 |
| B unit | 3 | 3 |
| C unit | 7 | 7 |

Back pressure 14-12 PSIG, Ammonia setting A 35, C 50 nitrogen enough to make product white.

The product was fluid going into box as a self leveling white liquid. It took 2.4 minutes to fill 10 lb.

|  | Condition two target | Condition two actual |
|---|---|---|
| Feed tank temp | 130 F. | 131 F. |
| Feed pump setting | 1 | 1 |
| Temp A outlet | 77-78 F. | 78 F. |
| Temp B outlet | 68 F. | 68 F. |
| Temp C outlet | 66 F. | 66 F. |
| varidrive setting on cooling unit shafts | | |
| A unit | 7 | 7 |
| B unit | 5 | 5 |
| C unit | 7 | 7 |

Back pressure 8 PSIG Ammonia setting A 45 C 50 nitrogen enough to make product white.

The product was fluid going into the box as a self leveling white liquid. It took 2.4 minutes to fill 10-lb.

|  | Condition three target | Condition three actual |
|---|---|---|
| Feed tank temp | 128 F. | 132 F. |
| Feed pump setting | 1 | 1 |
| Temp A outlet | 78 F. | 78-77 F. |
| Temp B outlet | 65 F. | 66-65 F. |
| Temp C outlet | 63 F. | 63-62 F. |
| varidrive setting on cooling unit shafts | | |
| A unit | 7 | 7 |
| B unit | 5 | 5 |
| C unit | 7 | 7 |

Back pressure 10 PSIG Ammonia setting A 40 C 45 nitrogen enough to make product white.

The product was fluid going into the box as a self leveling white liquid. It took 2.4 minutes to fill 10-lb.

Example 57

In Example 57, pilot plant all purpose shortening was conducted using the following ingredients:

| Ex. | Palm Hard Fat (%) | Soya Hard Fat (%) | QC 150 CreaFibe (%) | Canola Oil (%) |
|---|---|---|---|---|
| 57 | 8.3313 | 2.4187 | 4.5000 | 84.7500 |

A batch of 150 lbs was started. The composition was formulated by mixing HOC, hard fat blend and cellulose. The complete blend was recirculated through pump and static mixer for 30 minutes before going to the cooling units. Static mixers were added to recirculate the blend to help desperse cellulose fiber before going to cooling units.

Line Configuration: A-C-B-Fill

|  | Condition one target | Condition one actual |
|---|---|---|
| Feed tank temp | 120-130 F. | 129 F. |
| Feed pump setting | 1 | 1 |
| Temp A outlet | 80 F. | 78 F. |
| Temp B outlet |  | 68 F. |
| Temp C outlet | 70 F. | 66 F. |
| varidrive setting on cooling unit shafts | | |
| A unit | 7 | 7 |
| B unit | 5 | 3 |
| C unit | 7 | 7 |

Back pressure 10 PSIG, Ammonia setting A 50, C 50 nitrogen enough to make product white.

The product was fluid going into box as a self leveling white liquid. It took 2.4 minutes to fill 10 lb.

|  | Condition two target | Condition two actual |
|---|---|---|
| Feed tank temp | 125-130 F. | 130 F. |
| Feed pump setting | 1 | 1 |
| Temp A outlet | 75 F. | 78-77 F. |
| Temp B outlet | 68 F. | 68 F. |
| Temp C outlet | 66 F. | 66 F. |
| varidrive setting on cooling unit shafts | | |
| A unit | 7 | 7 |
| B unit | 5 | 5 |
| C unit | 7 | 7 |

Back pressure 10 PSIG Ammonia setting A 50 C 50 nitrogen enough to make product white.

The product was fluid going into the box as a self leveling white liquid. It took 2.4 minutes to fill 10-lb.

|  | Condition three target | Condition three actual |
|---|---|---|
| Feed tank temp | 125-130 F. | 128 F. |
| Feed pump setting | 1 | 1 |
| Temp A outlet | 78 F. | 78 F. |
| Temp B outlet |  | 65 F. |
| Temp C outlet | 63 F. | 63 F. |
| varidrive setting on cooling unit shafts | | |
| A unit | 7 | 7 |
| B unit | 5 | 5 |
| C unit | 7 | 7 |

Back pressure 8 PSIG Ammonia setting A 55 C 40 nitrogen enough to make product white.

The product was fluid going into the box as a self leveling white liquid. It took 2.4 minutes to fill 10-lb.

The all purpose shortening and cake and icing shortening samples prepared in Examples 55 and 56 were stored for 72 hours at 70° F. and then inspected. All samples were soft plastic shortenings. A cube of each set was returned to 70° F. storage and a cube of each set was moved to an 85° F. controlled temperature room to simulate transport during warmer months. After eigth days, the cubes stored at 85° F. were examined. No oiling out was observed. About half the material was scooped into a new bag and box and returned to storage at 85° F. The other half was moved back to storage at 70° F. The oil stored for the whole time at 70° F. was application tested. The oil stored for 72 hours at 70° F. taken to 85° F. for eight days and brought back to 70° F. was evaluated in certain applications. The oil held at 70° F. moved and held at 85° F. was evaluated in certain applications. The oil held 70° F. performed well, the oil moved to 85° F. and returned to 70° F. performed well. The oil moved to 85° F. and kept at 85° F. in the case of the cake and icing formulation made a cake but not an icing.

The cake and icing formulation did not work in a pound cake formulation.

The shortening compositions provided herein were tested in various bakery applications. In application in cookies, it appeared that there was a relation between fiber content in the shortening compositions and spread during baking. As the fiber content increased spread decreased.

In pie crust testing, the fiber containing shortenings made a less flake crust but one that shrank less and had a higher weight after baking Small chocolate chips (4000 count chips per lb) were more visible in baked cookies that used fiber containing shortenings. As chip size or inclusion size increased this characteristic of appearing more visible rapidly declined to essential equality.

Of the emulsified shortenings, shortenings of Examples 53 and 55 had the best overall performance.

The shortenings were also tested in rolled sugar cookies with success.

Throughout this application, various publications are referenced. The disclosures of these publications in their entireties are hereby incorporated by reference into this application in order to more fully describe the compounds, compositions and methods described herein.

Various modifications and variations can be made to the compounds, compositions and methods described herein. Other aspects of the compounds, compositions and methods described herein will be apparent from consideration of the specification and practice of the compounds, compositions and methods disclosed herein. It is intended that the specification and examples be considered as exemplary.

What is claimed is:

1. A shortening composition comprising an admixture of a cellulose fiber, about 5 to about 20% hard fat by weight based on total weight of the composition, and a liquid oil, wherein the shortening composition comprises less than about 1% water by weight based on total weight of the composition.

2. The shortening composition of claim 1, wherein the cellulose fiber is from a plant source.

3. The shortening composition of claim 1, wherein the cellulose fiber comprises cellulose fiber from bamboo, pea, citrus fruit or suger beet.

4. The shortening composition of claim 1, wherein the cellulose fiber is present in an amount from about 1 to 15% by weight based on the total weight of the composition.

5. The shortening composition of claim 1, wherein the amount of cellulose fiber is from about 3 to 10% by weight based on the total weight of the composition.

6. The shortening composition of claim 1, wherein the amount of cellulose fiber is from about 3 to 6% by weight based on the total weight of the composition.

7. The shortening composition of claim 1, wherein the hard fat comprises a fully or partially hydrogenated oil, solid stearin fraction, diglyceride, monoglyceride, wax or a mixture thereof.

8. The shortening composition of claim 7, wherein the fully hydrogenated oil is selected from fully hardened fish oil, fully hardened animal oil, fully hardened palm oil, fully hardened high erucic rape seed oil, fully hardened soya oil, fully hardened sun flower oil, fully hardened corn oil, fully hardened peanut oil, fully hardened safflower oil, fully hardened olive oil, fully hardened palm stearin, fully hardened palm olein, a derivative and mixture thereof.

9. The shortening composition of claim 7, wherein the partially hydrogenated oil is selected from partly hardened fish oil, partly hardened animal oil, partly hardened palm oil, partly hardened high erucic rape seed oil, partly hardened soya oil, partly hardened sun flower oil, partly hardened corn oil, partly hardened peanut oil, partly hardened safflower oil, partly hardened olive oil, partly hardened palm stearin, partly hardened palm olein, partly hardened cotton seed oil, a derivative and mixture thereof.

10. The shortening composition of claim 1, wherein the hard fat is selected from palm hard fat, soybean oil hard fat, cotton hard fat, palm stearin and a mixture thereof 11. The shortening composition of claim 1, wherein the hard fat is a blend of palm hard fat and soybean oil hard fat.

12. The shortening composition of claim 1, wherein the hard fat is present in an amount from about 8 to about 15% by weight based on total weight of the composition.

13. The shortening composition of claim 1, wherein the liquid oil comprises canola, high oleic canola, soybean, corn, sunflower, rapeseed, peanut, safflower, olive, cottonseed, or a mixture thereof.

14. The shortening composition of claim 1, wherein the liquid oil is present in an amount from about 75 to about 90% by weight based on total weight of the composition.

15. A food product comprising the shortening of claim 1.

16. A method of preparing a shortening, the method comprising the steps of
providing a composition comprising a cellulose fiber, about 5 to about 20% hard fat fraction by weight based on total weight of the composition, and a liquid oil, wherein the composition comprises less than about 1% water based on the total weight of the composition, and
mixing the composition to provide the shortening.

17. The method of claim 16, wherein the cellulose fiber and the liquid oil are blended prior to addition of the hard fat.

18. The method of claim 16, wherein the hard fat and the liquid oil are blended prior to addition of the cellulose fiber.

19. The method of claim 16, wherein the composition is heated during the mixing step to a temperature of about 45° C. to about 90° C.

20. The method of claim 19 comprising a further step of cooling the mixed composition.

21. The method of claim 20, wherein the step of cooling is performed in a heat exchanger.

22. The method of claim 21, wherein the heat exchanger is a scraped surface heat exchanger.

23. A shortening composition comprising an admixture of a cellulose fiber, a hard fat, and about 75 to about 90% liquid oil by weight based on total weight of the composition, wherein the shortening composition comprises less than about 1% water by weight based on total weight of the composition.

24. The shortening composition of claim 23, wherein the hard fat is present in an amount from about 5 to about 20% by weight based on total weight of the composition 25. A method of preparing a shortening, the method comprising the steps of
providing a composition comprising a cellulose fiber, a hard fat fraction, and about 75 to about 90% liquid oil by weight based on total weight of the composition, wherein the composition comprises less than about 1% water based on the total weight of the composition, and
mixing the composition to provide a shortening.

* * * * *